HIGH-SPEED TIME DIVISION MULTIPLEX TRANSMISSION SYSTEM

Filed June 21, 1961 2 Sheets-Sheet 1

INVENTORS.
BARRIE BRIGHTMAN
J. CARTER PERKINS, JR.
BY Robert Nathans
ATTORNEY

United States Patent Office 3,226,709
Patented Dec. 28, 1965

3,226,709
HIGH-SPEED TIME DIVISION MULTIPLEX TRANSMISSION SYSTEM

Barrie Brightman, Webster, and J. Carter Perkins, Jr., Victor, N.Y., assignors to General Dynamics Corporation, Rochester, N.Y., a corporation of Delaware Filed June 21, 1961, Ser. No. 118,586
11 Claims. (Cl. 340—347)

The present invention relates to time division multiplex transmission systems.

In electronic telephone and telemetering systems it is often necessary to quantize at high speed a plurality of analog signals and transmit the resulting binary representations over a transmission link to be reconverted into analog signals at the receiver.

Although numerical pulse trains, or trains having varying pulse widths, may be utilized for the transmission of analog information, the transmission of binary representation affords maximum accuracy and reliability. Since thousands of these transmission systems may be utilized in a given telephone system, and particularly in carrier transmission systems which employ radio links, the cost, degree of compactness, simplicity, and reliability of each system is of considerable importance.

One type of high-speed analog-to-digital converter, known as a "digit at a time" converter, converts the analog signal into a set of digital signals one digit at a time pursuant to a weighing and comparing process, as is well known in the art. However, these converters are complicated and limited in accuracy due to the difficulty of obtaining a plurality of separate voltages accurately representing the magnitude of the binary digits and the difficulty in accurately subtracting these voltage increments from the analog sample.

So-called "continuous" types of converters, which are well known in the art, continuously compare the amplitude of the analog signal to be converted with a variable reference voltage representing the digital count in a counter so as to produce a difference voltage to further control the count until the magnitude of the reference voltage and the analog signal are equal. However, these converters will not operate at high speed if a plurality of analog signals are to be converted by a single converter as required in an inexpensive high-speed time division multiplex transmission system.

Accordingly, it is a principal object of the present invention to provide a new and improved time division multiplex transmission system.

It is a further object of the present invention to provide a new and improved high-speed system for quantizing a plurality of analog signals, transmitting the signals in binary form over a transmission link, and reconverting the binary signals into corresponding analog signals.

Further objects and advantages of the invention will become apparent as the following description proceeds and the features of novelty which characterize the invention will be pointed out with particularity in the claims annexed to and forming a part of this specification.

Figure 1:
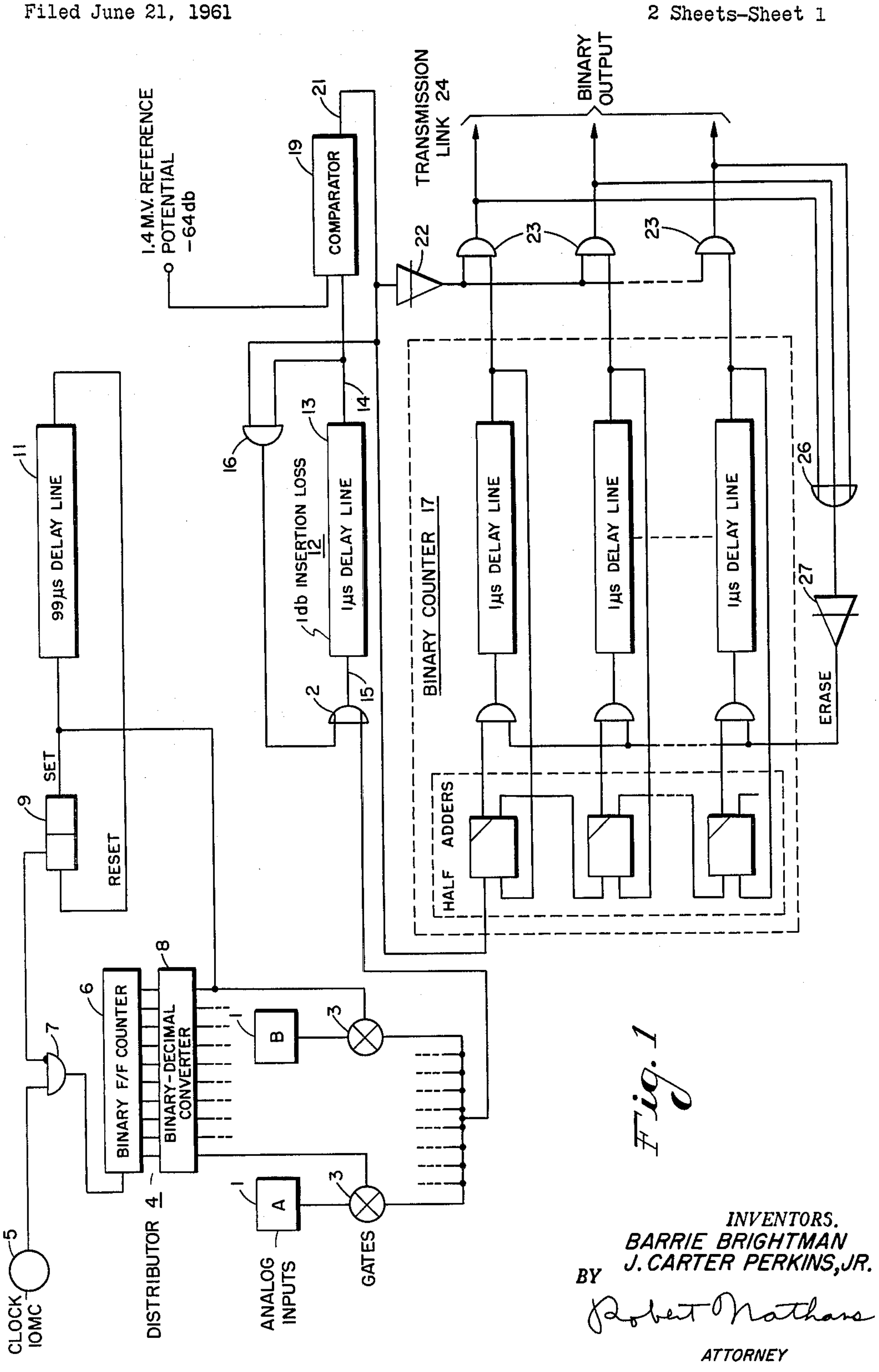

For a better understanding of the invention, reference may be had to the accompanying drawings in which:

FIGURE 1 discloses the transmitter of the present invention; and

Figure 2:
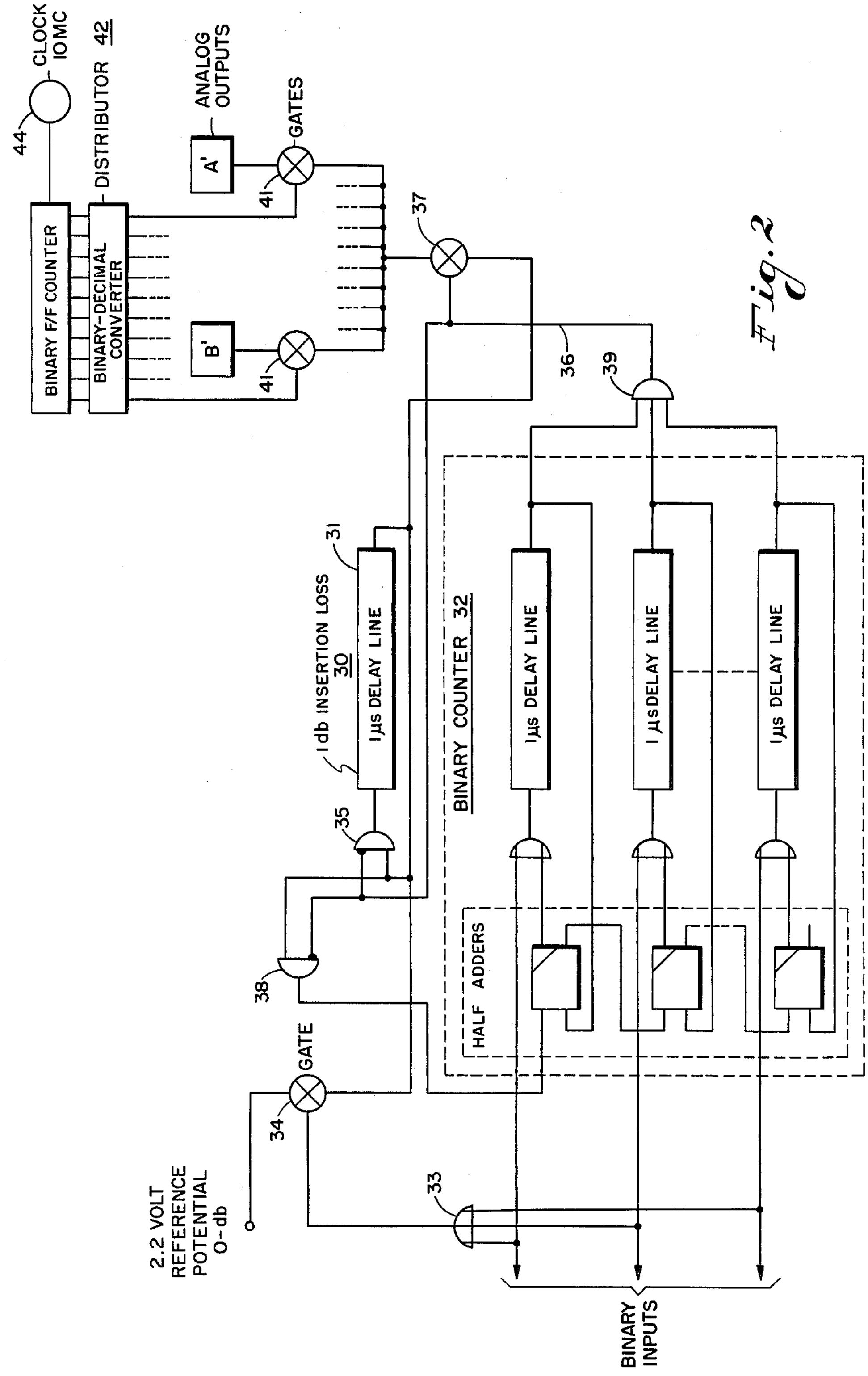

FIGURE 2 discloses the receiver of the present invention.

Generally speaking, the analog-to-digital conversion of the various analog input signals to be transmitted, which is performed by the circuitry of FIGURE 1, is accomplished by introducing these signals sequentially into a dynamic storage element which forms part of a recirculation loop. The analog signals recirculate in the recirculation loop and their amplitude is altered a given amount for each recirculation. A conventional binary counter utilizing a dynamic storage element for each binary digit counts the number of recirculations so that the counter contains a binary number in the same time position as the time position of its associated analog signal, which number is representative of the number of times the analog signal has recirculated in the loop. When a particular analog signal reaches a given voltage level, the binary number associated with the analog signal and contained within the binary counter is transmitted over the transmission link and is erased from the counter.

The digital-to-analog converter utilized in the receiver of FIGURE 2, receives the transmitted binary representation and causes it to be inserted into a binary counter of the type mentioned hereinabove. At this time, an analog reference signal is inserted into a dynamic storage element which forms part of a recirculation loop similar to the recirculation loop at the transmitter. The analog reference signal recirculates in the loop and the binary counter is advanced for each recirculation. When the binary counter reaches a predetermined count, the recirculating reference voltage, which has been altered a fixed amount for each recirculation, is fed into a distributor which forwards the signal to appropriate analog output circuitry.

Referring now to the transmitter of FIGURE 1, a plurality of analog input circuits 1 are disclosed, coupled to a first terminal of OR gate 2 through associated line gates 3. A special type of distributor 4 is disclosed having a clock 5 coupled to the input circuit of a binary flip-flop counting chain 6 through inhibit gate 7. The output circuitry of counter 6 is coupled to an ordinary binary-to-decimal converter 8, which will cause gate 3 to be sequentially enabled as the counter is driven by clock 5. Since clock 5 is operating at a frequency of ten megacycles, binary counter 6 will be stepped every tenth of a microsecond to sequentially enable the gates. At the end of one microsecond or subframe, flip-flop 9 will be set, thereby to prevent pulses produced subsequently by clock 5 from passing through inhibit gate 7. A ninety-nine microsecond delay device 11 causes flip-flop 9 to become reset after ninety-nine microseconds or ninety-nine subframes, thereby to again allow pulses produced by clock 5 to pass through inhibit gate 7 to drive binary counter 6 during the first microsecond period or subframe during the second transmission frame. Accordingly, circuitry is provided for sequentially opening gates 3 during the first subframe only within recurring transmission frames, each frame containing one-hundred subframes. In the particular embodiment of the present invention disclosed in FIGURE 1, ten analog input circuits would be coupled to OR gate 2 through ten gates.

Recirculation loop 12 comprises a dynamic store 13, which may be a delay line, a shift register, or the like, having an output circuit 14 coupled to an input circuit 15 through AND gate 16 and OR gate 2. Accordingly, during the first microsecond period or subframe within each recurring transmission frame, analog input signals are inserted into dynamic store 13. The binary counter 17, which is of a conventional design, utilizes one-microsecond delay lines similar to delay line 13, together with half-adders 18, one for each stage of the counter, as shown in FIGURE 1. See page 197 of "Arithmetic Operations in Digital Computers" by R. K. Richards, D. Van Nostrand 1955. As mentioned hereinabove, the binary counter is utilized to count the number of times the analog signals recirculate in dynamic store 13 before a given voltage level is reached, and to store binary numbers representative of these counts in time intervals or time slots associated with the analog signals. A comparator 19 produces a mark in its output circuit upon each recirculation of each analog signal in loop 12, as long as these signals are greater than 1.4 millivolts, which is utilized as the voltage datum to represent a —64 db level. When an analog signal recirculating in loop 12 is reduced to less than 1.4 millivolts, however, a mark will not be produced by comparator 19. Since the output circuit 21 of comparator 19 is coupled to the input circuit of binary counter 17, the binary counter will count the number of times each analog signal recirculates in loop 12 until the recirculating signal has an amplitude of less than 1.4 millivolts. At this time, a mark will be produced in the output circuit of inverter 22, thereby to enable AND gates 23 to cause the binary count within counter 17 to be transmitted over transmission link 24, which may be a radio link or a cable, having a plurality of channels, one for each digit of the binary code. At this time, the presence of a mark in the output circuits of at least one AND gate 23 will pass through OR gate 26 and cause an erase condition to be produced by inverter 27, thereby to erase the bits previously circulating in counter 17. The no-mark condition produced by comparator 19 during the read out interval will also disenable AND gate 16 to erase the analog signal from the recirculation loop. Numerous types of comparators which are well known in the art may be utilized.

Since the recirculating analog signals are reduced one db for each recirculation due to the design of loop 12, it follows that the greater the initial amplitude of the input signals the greater the number of recirculations (and the greater the corresponding count) before the 1.4 millivolt reference potential is reached to effect readout. The system was designed so that 2.2 volts are equated with a zero db level, and 1.4 millivolt reference potential is equated with a —64 db level at 600 ohms. For instance, let us assume that an analog input signal having an amplitude of 2.2 volts or an intensity of zero db is inserted into recirculation loop 12. In this case, the signal would recirculate sixty-four times before read out is effected and, accordingly, a count of sixty-four would be contained within binary counter 17 during the time position or time slot corresponding to this recirculating signal. On the other hand, if a —62 db signal were introduced, the signal would recirculate only twice before read out of the binary number "2" is effected.

In summary, the greater the amplitude of the input signal the greater the number of recirculations before the —64 db reference level is reached and, accordingly, the greater the binary number read out of counter 17 at this time. It should be understood that one of the major features of the present invention relates to altering the analog signals recirculating in loop 12 a given amount for each recirculation. Accordingly, it is obvious that the recirculating signals instead of being reduced one unit owing to insertion loss of components within the loop may be amplified one unit for each recirculation. It follows that at the end of sixty-four subframes all signals will be erased from the dynamic stores and the converter is prepared to receive fresh signals during the first subframe of the succeeding transmission frame.

Referring now to the receiver disclosed in FIGURE 2, a recirculation loop 30 is disclosed including a one-microsecond delay device 31. The binary number transmitted over the transmission link 24 is fed in parallel fashion into binary counter 32. Since at least one mark will be applied to the input circuitry of OR gate 33, gate 34 will be enabled during this read in period and, accordingly, a reference pulse having an amplitude of 2.2 volts or a zero db level is fed into delay device 31 via inhibit gate 35. This pulse will continue to recirculate in the recirculation loop until a mark is produced on lead 36 which causes gate 37 to be opened and causes gate 35 to assume an inhibit condition. Until this mark is produced on lead 36, a mark will be produced by inhibit gate 38 each time the reference pulse recirculates within loop 30. Binary counter 32 is stepped once for each recirculation of the reference pulse within loop 30 and continues to be stepped until counter 32 registers the maximum count. At this time, AND gate 39 is fully enabled. As mentioned hereinabove, this mark causes the recirculating reference voltage to pass through gate 37 and through one of the line gates 41 into the appropriate analog output circuit. A mark on lead 36 prevents inhibit gate 38 from transmitting a mark into the input circuit of counter 32 and also prevents further recirculation of the mark in loop 30 owing to the inhibiting of inhibit gate 35. The counter at this time will reset to zero.

It should thus be apparent that the smaller the binary number introduced into binary counter 32 the greater the number of recirculations necessary before counter 32 registers a full count and, accordingly, owing to the fixed reduction of the recirculating voltage per recirculation, the smaller will be the amplitude of the recirculating pulse introduced into distributor 42. On the other hand, the greater the value of the binary number fed into the binary counter 32 the smaller the number of recirculations before binary counter 32 registers the full count and, accordingly, the greater the amplitude of the impulse fed through gate 37 to distributor 42. Should all binary "1's" be read into every stage of counter 32, AND gate 39 will immediately produce a mark, thereby to transmit the 2.2 volt reference signal immediately into distributor 42 via gate 37.

Unlike distributor 4 of FIGURE 1, distributor 42 operates to sequentially enable line gates 41 repeatedly. In other words, where distributor 4 sequentially operates gates 3 during the first subframe of one microsecond during each one-hundred microsecond transmission frame, distributor 42 sequentially enables line gates 41 during every subframe within each transmission frame. This is necessary because each recirculating signal within loop 30 may be fed to distributor 42 during a subframe which is not fixed since it is a function of the binary information transmitted over line 24. However, it is important that the first gate 41 is enabled during an interval within each subframe which corresponds to the interval within the first subframe when the first gate 3 was enabled. Other gates are synchronized in like manner. Accordingly, clock 44, which produces impulses at a frequency of ten megacycles in the manner of clock 5, must be synchronized with clock 5. Such apparatus for synchronizing these clocks is not shown since it is well known in the art.

It is obvious that logic circuitry may be provided in the place of AND gate 39 to provide an output signal to read out the recirculating reference pulse at some particular count, which need not represent the full count condition. Also, counter 32 could be stepped backward instead of forward. As in the case of the transmitter of FIGURE 1, the reference signal may be amplified a fixed amount for each recirculation, if desired. More specifically, the binary counter could be arranged to count backwards, an OR gate could be substituted for the AND gate 39, an inverter could be added in the output circuit of the OR gate, and an amplifier could be inserted into recirculation loop 30 to increase the level of the recirculating reference signal by one db for each recirculation. With such an arrangement, the greater the binary number fed into counter 32 the greater the number of recirculations required to cause the reverse operating counter to register a "0" and the greater the amplitude of the reference signal transmitted to transmitter 42.

Where the system is operating on the basis of a transmission frame of one-hundred microseconds with a sixty-four db level of measure, all analog input signals introduced at the transmission end of the system would be read out into the analog output storage units, such as A′ and B′ (which could be simply a bank of capacitors), at the receiver at the end of sixty-four microseconds.

Accordingly, the analog inputs would be sampled every one-hundred microseconds.

While there has been disclosed what is at present considered to be the preferred embodiment of the invention, other modifications will readily occur to those skilled in the art. It is not, therefore, desired that the invention be limited to the specific arrangement shown and described and it is intended in the appended claims to cover all such modifications as fall within the true spirit and scope of the invention.

What is claimed is:

1. An analog-to-digital converter comprising, means for producing an analog input signal to be quantized, a recirculation loop for altering the amplitude of a signal circulating in said loop a fixed amount for each recirculation, means for introducing said analog input signal into said recirculation loop, means for producing a reference signal, and means for registering the number of times said analog input signal circulates in said recirculation loop before said signal reaches the level of said references signal.

2. An analog-to-digital converter comprising, means for producing an analog input signal to be quantized, a recirculation loop for decreasing the amplitude of a signal circulating in said loop a fixed amount for each recirculation, means for introducing said analog input signal into said recirculation loop, means for producing a reference signal, and means for registering the number of times said analog input signal circulates in said recirculation loop before said signal is reduced to the level of said reference signal.

3. In combination, N sources of analog signals to be quantized, a recirculation loop for storing N signals produced by said sources and being able to attenuate said signals a fixed amount for each recirculation, means for successively transmitting said signals from said sources into said means for storing, means for comparing the amplitude of each signal circulating in said recirculation loop with the amplitude of a reference signal and for producing an output signal for each recirculation of each signal in said loop that has a greater amplitude than the amplitude of said reference potential, a counter having an input circuit coupled to the output circuit of said means for comparing to register a count each time said means for comparing produces an output signal, and means responsive to the lack of an output signal from said means for comparing for reading out the count registered in said counter.

4. The combination as set forth in claim 3 further including means responsive to the lack of an output signal from said means for comparing for erasing the count from said counter.

5. In combination, N sources of analog signals to be quantized, a recirculation loop for storing N signals produced by said sources and for altering the amplitudes of said signals a fixed amount for each recirculation, means for successively transmitting said signals from said sources into said means for storing, means for comparing the amplitude of each signal circulating in said recirculation loop with the amplitude of a reference signal and for producing an output signal for each recirculation of each signal in said loop as long as each signal differs from said reference signal in a first sense but not in a second sense, a counter having an input circuit coupled to the output circuit of said means for comparing for registering a count each time said means for comparing produces an output signal, and means responsive to the lack of an output signal from said means for comparing for reading out the count registered in said counter.

6. The combination as set forth in claim 5 further including means responsive to the lack of an output signal from said comparator for erasing the count from said counter.

7. A digital-to-analog converter comprising, a source of digital information, a counter for producing an output signal when a predetermined count is registered therein, a recirculation loop for altering the amplitude of a signal circulating in said loop a fixed amount for each circulation, means coupled to said source for introducing a reference signal into said recirculation loop while introducing said digital information in said counter to register a count therein, means for changing the count in said counter a fixed amount each time said reference signal recirculates in said recirculation loop, and means for introducing the signal recirculating in said recirculation loop into the output circuit of said converter in response to the production of said output signal by said counter when said predetermined count is reached.

8. A digital-to-analog converter comprising, a source of digital information, a counter for producing an output signal when a predetermined count is registered therein, a recirculation loop including a dynamic storage device having a fixed insertion loss, means coupled to said source for introducing a reference signal into said recirculation loop while simultaneously introducing said digital information in said counter to register a count therein, means for changing the count in said counter a fixed amount each time said reference signal recirculates in said recirculation loop, and means for introducing the signal recirculating in said recirculation loop into the output circuit of said converter in response to the production of said output signal by said counter when said predetermined count is reached.

9. In a time division multiplex transmission system for transmitting information during repetitive transmission frames, each transmission frame including a plurality of subframes; N sources of analog signals to be quantized, a first recirculation loop for storing N signals produced by said sources and for altering the amplitudes of said signals a predetermined amount for each recirculation, a first distributor for successively transmitting said signals from said sources into said first recirculation loop during a particular subframe within each transmission frame, means for comparing the amplitude of each signal circulating in said first recirculation loop with the amplitude of a reference signal and for producing an output signal for each recirculation of each signal in said loop as long as each signal differs from said reference signal in a first sense but not in a second sense, a first counter having an input circuit coupled to the output circuit of said means for comparing for registering a count each time said means for comparing produces an output signal, a transmission link, means responsive to the lack of an output signal from said means for comparing for reading out the count registered in said first counter into one end of said transmission link, a second counter for producing an output signal when a predetermined count is registered therein, means coupled to the other end of said transmission link for feeding the information transmitted over said transmission link into said second counter, a second recirculation loop for altering the amplitudes of signals circulating in said loop a fixed amount for each circulation, means for introducing reference signals into said second recirculation loop when information is being fed into said second counter, means for changing each count in said second counter a fixed amount each time an associated reference signal recirculates in said second recirculation loop, N storage units, a second distributor having an input circuit for transmitting the signals read out of said second recirculation loop into said N storage units during a plurality of subframes within each transmission frame, and means for reading out signals recirculating in said second recirculation loop into the input circuit of said second distributor in response to the production of an output signal by said second counter when said predetermined count is reached.

10. In a time division multiplex transmission system for transmitting information during repetitive transmission frames, each transmission frame including a plurality of subframes, N sources of analog signals to be quantized, a first recirculation loop for storing N signals produced by said sources and for attenuating the amplitudes of said signals a predetermined amount for each recirculation, a first distributor for successively transmitting said signals form said sources into said first recirculation loop during a particular subframe within each transmission frame, means for comparing the amplitude of each signal circulating in said first recirculation loop with the amplitude of a reference signal and for producing an output signal for each recirculation of each signal in said loop as long as each signal is greater than said reference signal, a first counter having an input circuit coupled to the output circuit of said means for comparing for registering a count each time said means for comparing produces an output signal, a transmission link, means responsive to the lack of an output signal from said means for comparing for reading out the count registered in said first counter into one end of said transmission link, a second counter for producing an output signal when a predetermined count is registered therein, means coupled to the other end of said transmission link for feeding the information transmitted over said transmission link into sad second counter, a second recirculation loop for attenuating the amplitudes of signals circulating in said loop a fixed amount for each circulation, means for introducing reference signals into said second recirculation loop when information is being fed into said second counter, means for changing each count in said second counter a fixed amount each time an associated reference signal recirculates in said second recirculation loop, N storage units, a second distributor having an input circuit for transmitting the signals read out of said second recirculation loop into said N storage units during a plurality of subframes within each transmission frame, and means for reading out signals recirculating in said second recirculation loop into the input circuit of said second distributor in response to the production of an output signal by said second counter when said predetermined count is reached.

11. In a time division multiplex transmission system for transmitting information during repetitive transmission frames, each transmission frame including a plurality of subframes, N sources of analog signals to be quantized, a first recirculation loop for storing N signals produced by said sources and for altering the amplitudes of said signals a predetermined amount for each recirculation, a first distributor for successively transmitting said signals from said sources into said first recirculation loop during a particular subframe within each transmission frame, means for comparing the amplitude of each signal circulating in said first recirculation loop with the amplitude of a reference signal and for producing an output signal for each recirculation of each signal in said loop as long as each signal differs from said reference signal in a first sense but not in a second sense, a first delay line counter having an input circuit coupled to the output circuit of said means for comparing for registering a count each time said means for comparing produces an output signal, a transmission link, means responsive to the lack of an output signal from said means for comparing for reading out the count registered in said first counter into one end of said transmission link, a second delay line counter for producing an output signal when a predetermined count is registered therein, means coupled to the other end of said transmission link for feeding the information transmitted over said transmission link into said second counter, a second recirculation loop including a delay line for altering the amplitude of signals circulating in said loop a fixed amount for each circulation, means for introducing reference signals into said second recirculation loop when information is being fed into said second counter, means for changing each count stored in said second delay line counter a fixed amount each time an associated reference signal recirculates in said second recirculation loop, N storage units, a second distributor having an input circuit for transmitting the signals read out of said second recirculation loop into said N storage units during a plurality of subframes within each transmission frame, and means for reading out signals recirculating in said second recirculation loop into the input circuit of said second distributor in response to the production of an output signal by said second counter when said predetermined count is reached.

References Cited by the Examiner

UNITED STATES PATENTS

| | | | |
|---|---|---|---|
| 2,754,503 | 7/1956 | Forbes | 340—347 |
| 2,969,535 | 1/1961 | Foulkes | 235—154 X |

MALCOLM A. MORRISON, *Primary Examiner.*